United States Patent
Doshi et al.

(10) Patent No.: US 7,674,355 B2
(45) Date of Patent: Mar. 9, 2010

(54) METHOD OF MEASURING MACRO AND MICRO STICKIES IN A RECYCLED SAMPLE CONTAINING PULP FIBERS

(75) Inventors: Mahendra R. Doshi, Appleton, WI (US); Robert L. de Jong, Appleton, WI (US); Salman Aziz, Appleton, WI (US)

(73) Assignee: Doshi & Associates, Inc., Appleton, WI (US)

( * ) Notice: Subject to any disclaimer, the term of this patent is extended or adjusted under 35 U.S.C. 154(b) by 89 days.

(21) Appl. No.: 12/011,522

(22) Filed: Jan. 28, 2008

(65) Prior Publication Data

US 2008/0283206 A1  Nov. 20, 2008

Related U.S. Application Data

(60) Provisional application No. 60/930,668, filed on May 18, 2007.

(51) Int. Cl.
 *D21F 11/00* (2006.01)
(52) U.S. Cl. .......................... 162/198; 162/49
(58) Field of Classification Search .................. 162/198
 See application file for complete search history.

(56) References Cited

U.S. PATENT DOCUMENTS

| | | | | |
|---|---|---|---|---|
| 5,936,024 | A * | 8/1999 | Ling et al. | 524/474 |
| 6,245,195 | B1 * | 6/2001 | Marwah | 162/5 |
| 6,841,390 | B1 * | 1/2005 | Banerjee | 436/146 |
| 2006/0048908 | A1 * | 3/2006 | Wang et al. | 162/199 |

OTHER PUBLICATIONS

Pulmac Inc, Pulmac Master Screen specification sheet, updated 2007 from www.pulmac.ca.*

Mahendra R. Doshi, Angeles Blanco, Carlos Negro, Gilles M. Dorris, Carlos C. Castro, Axel Hamann, R. Daniel Haynes, Carl Houtman, Karen Scallon, Hans-Joachim Putz, Hans Johansson, R. A. Venditti, K. Copeland, H-M. Chang, Comparison of Microstickies Measurement Methods Part 1: Sample Preparation and Measurement Methods, Aug. 2003, pp. 35-42, Progress in Paper Recycling, vol. 12, No. 4.

Mahendra R. Doshi, Angeles Blanco, Carlos Negro, Concepcion Monte, Gilles M. Dorris, Carlos C. Castro, Axel Hamann, R. Daniel Haynes, Carl Houtman, Karen Scallon, Hans-Joachim Putz, Hans Johansson, R. A. Venditti, K. Copeland, H-M. Chang, Comparison of Microstickies Measurement Methods Part 2: Results and Discussion, Nov. 2003, pp. 44-53, Progress in Paper Recycling, vol. 13, No. 1.

(Continued)

*Primary Examiner*—Eric Hug
*Assistant Examiner*—Jacob Thomas Minskey
(74) *Attorney, Agent, or Firm*—Thomas J. Connelly; Wilhelm Law, S.C.

(57) ABSTRACT

A method of measuring macro and micro stickies in a recycled sample containing pulp fibers is disclosed. The method includes forming a slurry of the recycled macro stickies and a liquid and using a first separation device to separate out the macro stickies and the pulp fiber while collecting the screenate. The macro stickies and the pulp fibers are then washed with additional liquid to further separate out any macro stickies while again collecting the screenate. The macro stickies are then removed from the first separation device and are measured. The method also includes agglomerating the micro stickies in the screenate to form agglomerated micro stickies. The screenate is routed through a second separation device to separate out the agglomerated micro stickies. The agglomerated micro stickies are then removed from the separation device and are measured.

20 Claims, 6 Drawing Sheets

OTHER PUBLICATIONS

C. Castro, G. M. Dorris, Measuring Microstickies Deposition by Monitoring Pressure Drop Through a Collector, May 2004, pp. 23-33, Progress in Paper Recycling, vol. 13, No. 3.

R. Daniel Haynes, Measurement of Micro Stickies Formation, Feb. 2003, pp. 19-26, Progress in Paper Recycling.

Thierry Delagoutte, Management and Control of Stickies, Nov. 2005, pp. 31-41, Progress in Paper Recycling, vol. 15, No. 1.

Hans Johansson, Bengt Wikman, Eva Lindstrom, Folke Osterberg, Detection and Evaluation of Micro-Stickies, Feb. 2003, pp. 4-12, Progress in Paper Recycling.

Tiina Sarja, Kemira Oyj, Donald MacNeil, Ulf Kunzel, Addressing the Nature of Stickies in Deinked Pulp, Undated, 9 Pages.

Robert De Jong, Salman Aziz, Mahendra Doshi, Determination of Macro and Microstickies in the Same Stock and Water Samples, Aug. 2006, pp. 22-28, Progress in Paper Recycling, vol. 15, No. 4.

Mahendra R. Doshi, Jeffrey M. Dyer, Overview, Recent Advances in Paper Recycling—Stickies, Copyrighted in 2002, pp. 1-13, Published by Domtar Inc., Cornwall, ON, Section 1: Introduction, Chapter 1.

A.X. Schmidt, C.A. Marlies, Adhesives, Principles of High-Polymer Theory and Practice, Chapter 15, Published 1948, 1 Page, McGraw-Hill Book Co. Inc., New York.

Pulmac Inc. trade literature, Pulmac Telegraph Times, The News Journal of Pulmac, Inc., Sep. 13, 2007, 2 Pages, vol. 4, No. 9.

Mahendra R. Doshi, Time to Break from Tradition, Editorial, Aug. 2007, 2 Pages, Progress In Paper Recycling, vol. 16, No. 4.

* cited by examiner

| A METHOD OF MEASURING MACRO AND MICRO STICKIES IN A RECYCLED SAMPLE CONTAINING PULP FIBERS, COMPRISING THE STEPS OF; |
|---|
| FORMING A SLURRY OF SAID RECYCLED SAMPLE AND A LIQUID AND USING A FIRST SEPARATION DEVICE TO SEPARATE OUT MACRO STICKIES AND PULP FIBERS WHILE COLLECTING A SCREENATE; |
| WASHING SAID MACRO STICKIES AND PULP FIBERS WITH ADDITIONAL LIQUID TO FURTHER SEPARATE OUT ANY MICRO STICKIES WHILE AGAIN COLLECTING SAID SCREENATE; |
| REMOVING SAID MACRO STICKIES AND SAID PULP FIBERS FROM SAID FIRST SEPARATION DEVICE AND MEASURING SAID MACRO STICKIES; |
| AGGLOMERATING SAID MICRO STICKIES IN SAID SCREENATE TO FORM AGGLOMERATED MICRO STICKIES; |
| ROUTING SAID SCREENATE THROUGH A SECOND SEPARATION DEVICE TO SEPARATE OUT SAID AGGLOMERATED MICRO STICKIES; AND |
| REMOVING SAID AGGLOMERATED MICRO STICKIES FROM SAID SECOND SEPARATION DEVICE AND MEASURING SAID AGGLOMERATED MICRO STICKIES. |

FIG. 3

```
┌─────────────────────────────────────────────────────────────────┐
│ A METHOD OF MEASURING MACRO AND MICRO STICKIES IN A             │
│ RECYCLED SAMPLE CONTAINING PULP FIBERS, COMPRISING THE          │
│ STEPS OF;                                                       │
└─────────────────────────────────────────────────────────────────┘
                                  │
┌─────────────────────────────────────────────────────────────────┐
│ FORMING A SLURRY OF SAID RECYCLED SAMPLE AND WATER              │
│ SAID SLURRY HAVING A CONSISTENCY OF AT LEAST ABOUT              │
│ 99.5% AND SAID WATER HAVING A TEMPERATURE OF AT LEAST           │
│ ABOUT 20° C;                                                    │
└─────────────────────────────────────────────────────────────────┘
                                  │
┌─────────────────────────────────────────────────────────────────┐
│ PASSING SAID SLURRY THROUGH A FIRST SEPARATION DEVICE           │
│ TO SEPARATE SAID MACRO STICKIES AND PULP FIBERS FROM            │
│ A SCREENATE CONTAINING MICRO STICKIES, FINES, ASH AND           │
│ WATER, SAID MACRO STICKIES BEING RETAINED ON SAID FIRST         │
│ SEPARATION DEVICE AND SAID SCREENATE PASSING THROUGH            │
│ SAID FIRST SEPARATION DEVICE;                                   │
└─────────────────────────────────────────────────────────────────┘
                                  │
┌─────────────────────────────────────────────────────────────────┐
│ COLLECTING SAID SCREENATE;                                      │
└─────────────────────────────────────────────────────────────────┘
                                  │
┌─────────────────────────────────────────────────────────────────┐
│ WASHING SAID MACRO STICKIES AND PULP FIBERS WITH                │
│ ADDITIONAL WATER HAVING A TEMPERATURE OF LESS THAN              │
│ ABOUT 25° C TO FURTHER SEPARATE OUT ANY MICRO STICKIES,         │
│ FINES AND ASH PRESENT THEREIN, AND COLLECTING SAID              │
│ SCREENATE;                                                      │
└─────────────────────────────────────────────────────────────────┘
                                  │
┌─────────────────────────────────────────────────────────────────┐
│ REMOVING SAID MACRO STICKIES AND PULP FIBERS FROM SAID          │
│ FIRST SEPARATION DEVICE AND MEASURING SAID MACRO                │
│ STICKIES;                                                       │
└─────────────────────────────────────────────────────────────────┘
                                  │
┌─────────────────────────────────────────────────────────────────┐
│ AGGLOMERATING SAID MICRO STICKIES IN SAID SCREENATE TO          │
│ FORM AGGLOMERATED MICRO STICKIES;                               │
└─────────────────────────────────────────────────────────────────┘
                                  │
┌─────────────────────────────────────────────────────────────────┐
│ ROUTING SAID SCREENATE CONTAINING AGGLOMERATED MICRO            │
│ STICKIES THROUGH A SECOND SEPARATION DEVICE TO                  │
│ SEPARATE OUT SAID AGGLOMERATED MICRO STICKIES; AND              │
└─────────────────────────────────────────────────────────────────┘
                                  │
┌─────────────────────────────────────────────────────────────────┐
│ REMOVING SAID AGGLOMERATED MICRO STICKIES FROM SAID             │
│ SECOND SEPARATION DEVICE AND MEASURING SAID                     │
│ AGGLOMERATED MICRO STICKIES.                                    │
└─────────────────────────────────────────────────────────────────┘
```

FIG. 4

A METHOD OF MEASURING THE CONCENTRATION OF MACRO AND MICRO STICKIES IN A SINGLE RECYCLED SAMPLE CONTAINING PULP FIBERS, COMPRISING THE STEPS OF;

FORMING A SLURRY OF SAID RECYCLED SAMPLE AND WATER HAVING A TEMPERATURE OF AT LEAST ABOUT 40°C, SAID SLURRY HAVING A CONSISTENCY OF AT LEAST ABOUT 99.5% WATER;

PASSING SAID SLURRY THROUGH A FIRST SEPARATION DEVICE TO SEPARATE SAID MACRO STICKIES AND SAID PULP FIBERS FROM A SCREENATE CONTAINING MICRO STICKIES, FINES, ASH AND WATER, SAID MACRO STICKIES BEING RETAINED ON SAID FIRST SEPARATION DEVICE AND SAID SCREENATE PASSING THROUGH SAID FIRST SEPARATION DEVICE;

COLLECTING SAID SCREENATE;

WASHING SAID MACRO STICKIES AND SAID PULP FIBERS WITH ADDITIONAL WATER HAVING A TEMPERATURE OF AT LEAST ABOUT 40°C TO FURTHER SEPARATE OUT ANY MICRO STICKIES, FINES AND ASH PRESENT THEREIN, AND COLLECTING SAID SCREENATE;

REMOVING SAID MACRO STICKIES AND PULP FIBERS FROM SAID FIRST SEPARATION DEVICE AND MEASURING SAID CONCENTRATION OF SAID MACRO STICKIES;

AGGLOMERATING SAID MICRO STICKIES IN SAID SCREENATE TO FORM AGGLOMERATED MICRO STICKIES;

ROUTING SAID SCREENATE CONTAINING AGGLOMERTED MICRO STICKIES THROUGH A SECOND SEPARATION DEVICE TO SEPARATE OUT SAID AGGLOMERATED MICRO STICKIES;

WASHING SAID AGGLOMERATED MICRO STICKIES WITH ADDITIONAL WATER HAVING A TEMPERATURE OF LESS THAN ABOUT 25°C TO FURTHER SEPARATE OUT ANY MICRO STICKIES, FINES AND ASH PRESENT THEREIN; AND

REMOVING SAID AGGLOMERATED MICRO STICKIES FROM SAID SECOND SEPARATION DEVICE AND MEASURING SAID CONCENTRATION OF SAID AGGLOMERATED MICRO STICKIES.

FIG. 5

Histogram of macrostickies and agglomerated microstickies in screenate of samples L1 and L2 shown in Table 1.

FIG. 6

METHOD OF MEASURING MACRO AND MICRO STICKIES IN A RECYCLED SAMPLE CONTAINING PULP FIBERS

CROSS REFERENCE TO RELATED APPLICATION

This patent application is a regular patent application claiming priority to U.S. Provisional Patent application 60/930,668, filed May 18, 2007.

FIELD OF THE INVENTION

This invention relates to a method of measuring macro and micro stickies in a recycled sample containing pulp fibers or in a sample of process water containing pulp fibers.

BACKGROUND OF THE INVENTION

In a paper recycling process, wastepaper or what is commonly referred to as recovered paper is processed to remove contaminants such as glass, pieces of metal in the form of paper clips and wire staples, wax, toner, inks, adhesives, etc. The process begins with pulping where the recovered paper is mixed with water, with or without chemicals, to produce pulp. The pulp is then processed through various mechanisms to remove contaminants of all types and sizes. For example, the pulp can be passed through one or more screens, be processed in a hydrocyclone, be subjected to various flotation devices, be washed and sometimes even bleached. Other operations can also be applied to the pulp.

Adequate removal of contaminants from the pulp is necessary prior to using the pulp on a paper machine wherein the pulp is made into a certain grade of paper or paper board. For example, the pulp can be processed into a printing grade of paper, into a writing grade of paper, into coated paper, into newsprint, into tissue, into paper towels, into liner board, into a corrugated medium, into box board or into any other known kind of paper. One class of contaminants that causes serious problems in papermaking using recycled fibers is called stickies. Stickies arise from adhesives, glues, pressure sensitive adhesives, hot melt glues, binders such as those used in ink, coatings, waxes and related materials. Stickies in pulp affect the efficient operation of a paper machine as well as the quality of the finished product. It is estimated that the annual cost expended by paper mills, in the United States alone, is well over $700 million.

Stickies are classified into various categories based upon their size, properties, origin and behavior. One commonly used classification is based primarily on the size of the stickies. In this classification, stickies are divided into either macro stickies or micro stickies. Macro stickies are those retained on a slotted or mesh screen, such as a slotted screen where each slot has a width dimension ranging from between about 0.003 inches to about 0.006 inches, or a mesh screen where the mesh size ranges from between about 100 mesh to about 200 mesh. Micro stickies are those stickies that pass through the above-identified screens.

Various methods can be used to measure the amount, size, concentration or other parameters of the macro stickies in a dry or wet pulp sample or in a slurry including pulp, water and other ingredients. In one example, a pulp sample is processed through a test device, such as a Pulmac Master Screen, manufactured by Pulmac Inc. of Quebec, Canada, where a slotted screen is used to separate macro stickies from pulp fibers, micro stickies, fines and ash. However, the Pulmac Master Screen currently is not able to measure micro stickies. There are currently several known methods for measuring micro stickies but most are either cumbersome to carry out, require an exorbitant amount of time to complete the test, require the test sample to be refrigerated for a period of time or are costly to perform. In addition, a number of these methods are not very effective in separating the macro stickies from the micro stickies thereby producing erroneous test results.

Now a method has been invented which is capable of measuring macro and micro stickies in a recycled sample containing pulp fibers or in process water containing pulp fibers. This method is less costly, more efficient and can be conducted in a matter of minutes. In addition, this method produces reliable test results for both the macro stickies and the micro stickies.

SUMMARY OF THE INVENTION

Briefly, this invention relates to a method of measuring macro and micro stickies in a recycled sample containing pulp fibers or in process water containing pulp fibers. The recycled sample can be used to measure the size, amount, concentration, as well as other parameters of the macro and micro stickies. The method includes the steps of forming a slurry of the recycled sample and a liquid. The slurry has a liquid consistency of above 98%. The slurry is then passed through a first separation device to separate the macro stickies and pulp fibers from the screenate. The screenate will contain micro stickies, fines, ash and liquid as well as contaminates that may be present. The macro stickies and pulp fibers will be retained on the first separation device and the screenate will pass through the first separation device. The screenate is then collected. The macro stickies and pulp fibers are then washed with additional liquid to further separate out any micro stickies, fines and ash present therein. Again the screenate is collected. The macro stickies and the pulp fibers are then removed from the first separation device and the macro stickies can be measured using one of many known procedures. The method further includes agglomerating the micro stickies in the screenate, using vacuum to form agglomerated micro stickies. The screenate, including the agglomerated micro stickies, is then routed through a second separation device to separate out the agglomerated micro stickies. Once the agglomerated micro stickies are separated out, they can be removed from the second separation device and be measured in a similar fashion as the macro stickies were measured. Alternatively, the screenate and the agglomerated micro stickies can be routed back through the first separation device or a variation of the first separation device to separate out the agglomerated micro stickies.

The general object of this invention is to provide a method of measuring macro and micro stickies in a recycled sample containing pulp fibers or in process water containing pulp fibers. A more specific object of this invention is to provide a method of measuring the concentration of macro and micro stickies in a single dry or wet recycled sample containing pulp fibers or in process water containing pulp fibers.

Another object of this invention is to provide a cost effective method for measuring the amount or size of macro and micro stickies in a single recycled sample containing pulp fibers or in process water containing pulp fibers.

A further object of this invention is to provide a method of measuring macro and micro stickies in a recycled sample containing pulp fibers or in process water containing pulp fibers in a relatively short period of time.

Still another object of this invention is to provide a method of measuring macro and micro stickies in a recycled sample containing pulp fibers or in process water containing pulp fibers which produces reliable test results.

Still further, an object of this invention is to provide a method of measuring macro and micro stickies in a recycled sample containing pulp fibers or in process water containing pulp fibers which can be performed on-line or off-line on a single test instrument in an efficient manner.

Other objects and advantages of the present invention will become more apparent to those skilled in the art in view of the following description and the accompanying drawings.

BRIEF DESCRIPTION OF THE DRAWINGS

FIG. 5 is a flow diagram of still a third method of measuring macro and micro stickies in a recycled sample containing pulp fibers or in process water containing pulp fibers using first and second separation devices.

DETAILED DESCRIPTION OF THE INVENTION

Figure 1:
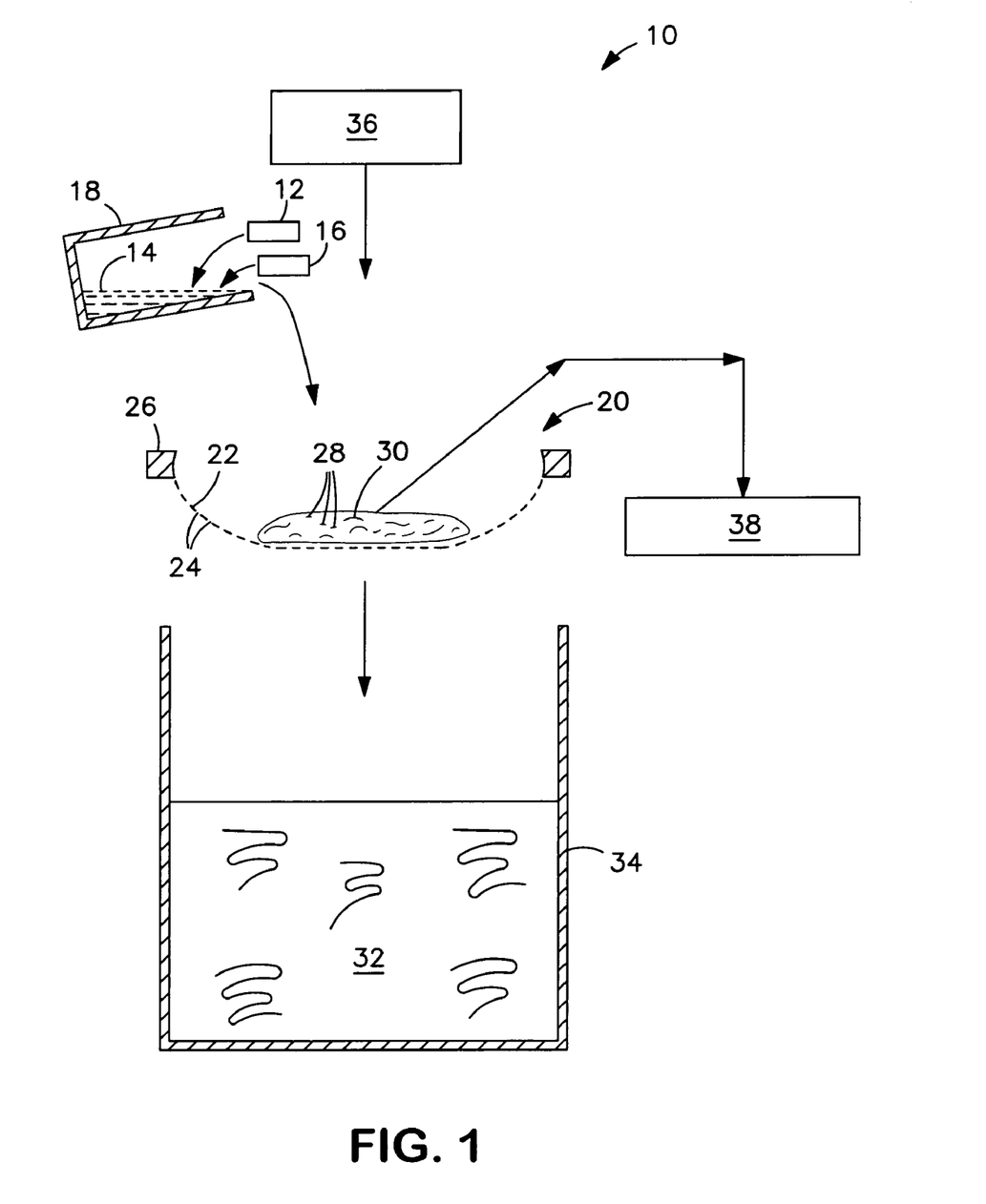
FIG. 1 is a schematic view of a first portion of the method of measuring macro and micro stickies in a recycled sample containing pulp fibers or in process water containing pulp fibers showing the first separation of the macro stickies and pulp fibers from the micro stickies, fines, ash and liquid.

Referring to FIG. 1, the first portion of a method 10 is shown which depicts an experimental setup used to demonstrate the separation of macro stickies from micro stickies in a recycled sample containing pulp fibers or in process water containing pulp fibers. By "pulp" it is meant a mixture of cellulose material, such as wood, plant, non-wood, paper or rags ground up into fibers and fines. Virgin pulp can be mixed with water to form the raw material needed to make various kinds of paper, paper board, liner board, cardboard, box board, etc. Once the various kinds of paper, paper board, liner board, cardboard, box board, etc. are formed, they can be cut, folded, creased, be printed on, have an adhesive adhered thereto or be combined with one or more other materials to form or be a part of a new product. Such products include but are not limited to: writing paper, graph paper, lined paper, carbon paper, filter paper, paper towels, paper napkins, toilet paper, paper printed as forms or notes, papers printed in various color using inks and dyes, envelopes which have adhesives and/or thermoplastic materials attached to them, self-stick note paper, paper packages having a foam layer attached thereto, packages, boxes and cartons which contain construction adhesive and/or glues to assist them in maintaining their overall shape, cardboard displays that can include staples or other kinds of fasteners to aid in their assembly, stickers and labels that can be attached to various items including: glass bottles, plastic containers, or any innate object, etc. Recycled pulp is pulp which is obtained from existing waste paper and/or paper and cardboard products that can be recycled so as to be used again in a new, similar or different form from the original product. By "recycle" it is meant to put or pass through a cycle again, as in an industrial process; to extract useful materials from waste; to extract and reprocess materials found in waste for reuse; or to adapt to a new use or function.

The recycled sample or the process water 12 will include pulp fibers, macro stickies, micro stickies, fines, ash, as well as any residual contamination that may be present in the recycled pulp. By "pulp fibers" it is meant fibers of cellulose pulp. By "macro stickies" it is meant particles or compounds that form bonds and act to cause a particle to adhere to, to be attached to or to be joined to another particle, fiber or compound. Typically, macro stickies include an adhesive or glue. Various adhesives are currently being used in the paper industry. Such adhesives include but are not limited to: starch and dextrin adhesive; casein adhesives; animal glue base adhesives; sodium silicate adhesives; polyvinyl acetate based adhesives; lacquer adhesives; hot melt adhesives; latex-based adhesives; re-moistenable adhesives; foil laminating adhesives and pressure sensitive adhesives.

Likewise, macro stickies can posses a tacky surface that allows them to be attached or be secured to another particle, fiber or compound. However, certain macro stickies can be formed by polymerization. By "polymerization" it is meant the bonding of two or more monomers to form a polymer; or the chemical process that affects this bonding. The macro stickies are of such size and configuration that they will not pass through the openings of a pre-selected sieve size but instead will be retained on the surface of such a sieve. Micro stickies are similar in composition and structure to macro stickies and vary therefrom only according to size. By "micro stickies" it is meant those particles or compounds that will pass through the openings of a pre-selected sieve size. Micro stickies are usually not visible to the naked eye and are too small for practical direct measurement. For purposes of this invention, micro stickies are defined as particles or compounds that can slip through at least a 0.003 inch (at least about 75 microns) opening or aperture formed in a sieve. By "fines" it is meant very small particles or elements. By "ash" it is meant materials such as clay, calcium carbonate, alum, etc. which remain as pulverized particulate matter or the grayish-white to black powdery residue from something that is burned.

Micro stickies are small and present no problem to the papermaker as they wash through the wire on a paper machine. However, as the micro stickies concentrate in the process water, they will eventually pass a point where they begin to spontaneously agglomerate. At this point, the agglomerated micro stickies become equivalent to macro stickies and can cause major problems in the manufacturing process and can jeopardize the quality of the finished product.

Still referring to FIG. 1, the method 10 includes forming a slurry 14 from the recycled sample containing pulp fibers or in process water containing pulp fibers 12 and a liquid 16, desirably water, in a container 18. The sample 12 can be either wet or dry before it is diluted with the liquid 16 and repulped, if necessary. The size of the sample 12 and the liquid 16, if present, can vary but a manageable size for this test method is a sample 12 ranging from between about 0.1 kilograms (kg) to about 10 kg. A "kilogram" is the base unit of mass in the International System, equal to 1,000 grams (2.2046 pounds). Desirably, the sample 12 and the liquid 16, if present, can range from between about 1 kg to about 5 kg. More desirably, the sample 12 and the liquid 16, if present, can range from between about 2 kg to about 4 kg. Even more desirably, the sample 12 and the liquid 16, if present, can be about 2.5 kg. The sample 12 should be diluted to a consistency of at least about 98%. Desirably, the sample 12 is diluted to a consistency of at least about 99%. More desirably, the sample 12 is diluted to a consistency of at least about 99.5%. Even more desirably, the sample 12 is diluted to a consistency of from between about 99.5% to about 99.9%.

The liquid 16 used to dilute the sample 12 can be water, distilled water, filtered water, water containing a chemical or chemical agent, or water which does not contain a chemical or chemical agent. Desirably, the liquid 16 is regular tap water which does not contain any additional constituents other than those added by a city's or town's municipal water treatment facility. The temperature of the liquid 16 should be at least about 20° Celsius (C) when it is added to the sample 12. Celsius, also referred to as centigrade, relates to a temperature scale that registers the freezing point of water at 0° and the boiling point at 100° under normal atmospheric pressure. Desirably, the temperature of the liquid 16 should be at least about 40° C. when it is added to the sample 12 and repulped, if necessary. More desirably, the temperature of the liquid 16 should be at least about 45° C. when it is added to the sample 12 and repulped, if necessary. Even more desirably, the temperature of the liquid 16 can be 50° C. or higher when it is added to the sample 12 and repulped, if necessary. It has been found that when the liquid 16 is at an elevated temperature of about 52° C. or higher, that any bonds present in the sample 12 can be more easily broken. By breaking such bonds, any macro stickies that are present in the sample 12 will be separated or divided out from the remaining constituents.

The amount of liquid 16 that can be used to dilute the sample 12 can vary. The amount of liquid 16 added to the sample should bring the liquid consistency up to at least about 90%, and desirably higher. However, it has been found that it is better to dilute the sample 12 to a liquid consistency greater than 90%. For example, about 98.5% liquid consistency works well. For example, if 1.5 grams of a dry sample 12 is used, than 98.5 grams of the liquid 16 can be used to dilute the sample 12. It should be understood that one skilled in the art can certainly use less or more liquid 16 to dilute the sample 12, if desired. When one uses a greater quantity of liquid 16 than the amount of sample 12, one must have a large enough container to collect the material that passes through a first separation device 20.

To facilitate dilution of the sample 12 in the liquid 16, various techniques known to those skilled in the art can be utilized. Examples of some such techniques include but are not limited to: mixing, blending, swirling, shaking, agitating, etc.

After the sample 12 has been diluted into a slurry 14, it is poured onto the first separation device 20. By "slurry" it is meant a thin mixture of a liquid, especially water, and any of several finely divided substances, such as pulp fibers, macro stickies, micro stickies, fines, ash, and/or a small quantity of any residual contaminants. The first separation device 20 can be constructed as a sieve 22, such as a mesh or slotted screen, a screen box, or some other mechanical mechanism which is capable of sifting or dividing out a particular size of particle or compound from the remaining slurry 14. By "sieve" it is meant a utensil of wire mesh or closely perforated metal, used for straining, screening or washing. Desirably, the first separation device 20 utilizes a sieve 22 that is a mesh screen.

In FIG. 1, the sieve 22 is depicted as a mesh screen having multiple openings 24 formed therein. The mesh screen is at least partially surrounded by a frame 26. By "mesh" it is meant any of the open spaces in a net or network; an interstice. The sieve 22 can have a mesh size ranging from between about 40 to about 400 mesh. Desirably, the sieve 22 has a mesh size ranging from between about 100 to about 200 mesh. More desirably, the sieve 22 has a mesh size ranging from between about 120 to about 200 mesh. Even more desirably, the sieve 22 has a mesh size of about 140 mesh. Each of the multiple openings 24 formed in the sieve 22 can be of approximately the same size. Each opening 24 can vary in size but should typically range from between about 50 to about 175 microns. Desirably, each of the multiple openings 24 formed in the sieve 22 can range from between about 70 to about 120 microns. More desirably, each of the multiple openings 24 formed in the sieve 22 can range from between about 100 to about 110 microns. An opening 24 of about 105 microns works well.

When the first separation device 20 is a slotted screen, not depicted, it can be constructed to have at least one slot formed therein. Desirably, a slotted screen will have multiple slots formed therein. Each slot can have a dimension, such as a width dimension, which ranges from between about 0.003 inches (about 75 microns) to about 0.006 inches (about 150 microns). Desirably, each slot can have a dimension that ranges from between about 0.003 inches (75 microns) to about 0.005 inches (about 125 microns). In addition to the width dimension, each slot will have a length that can vary from a fraction of an inch to several inches in dimension.

As depicted in FIG. 1, the method 10 includes passing the slurry 14 through the first separation device 20 to separate the macro stickies 28 and pulp fibers 30 from the micro stickies, fines, ash and water, and well as any residual contamination that may be present in the slurry 14. The micro stickies, fines, ash and water, and well as any residual contamination that may be present in the slurry 14, is referred to as "screenate" 32. The macro stickies 28 and the pulp fibers 30 are retained on the upper surface of the first separation device 20, above the sieve 22, while the screenate 32 will pass down through the openings 24 of the first separation device 20 into a collection vessel 34. The collection vessel 34 can vary in capacity but it has been found that a 5 gallon bucket works well. The macro stickies 28 are generally defined as those particles or compounds that are retained on or above the first separation device 20 because they are too large in size to pass through the openings 24 formed in the sieve 22. The geometrical structure or shape of each macro sticky 28 can be identical, uniform, similar or different in appearance. The composition of each macro sticky 28 will generally be different in size and appearance. The micro stickies are defined as those particles or compounds that will pass through the openings 24 formed in the sieve 22. Since the micro stickies are very small and may not be visible to the naked eye, they are not enumerated by a numerical number in FIG. 1.

As mentioned above, the screenate 32, which contains the micro stickies, is collected in the collection vessel 34. Either simultaneously or sequentially with the pouring of the slurry 14 onto the first separation device 20, the macro stickies 28 and the pulp fibers 30 can be washed with additional wash liquid 36, desirably water, to further separate out any micro stickies, fines, ash, as well as any residual contamination that may be present in the macro stickies 28 and pulp fibers 30 residing above the sieve 22. The additional wash liquid 36 should be maintained at an elevated temperature. Desirably, the temperature of the additional wash liquid 36 should be closely matched to that of the dilution liquid 16. More desirably, the additional wash liquid 36 is maintained at a temperature that is essentially equal to the temperature of the dilution liquid 16. Even more desirably, the additional wash liquid 36 is maintained at a temperature that is equal to or higher than the temperature of the dilution liquid 16. As stated above, the temperature of the dilution liquid 16 can range from between about 20° C. to about 52° C. or higher, and therefore the additional wash liquid 36 can be at that same temperature.

It should be understood that additional washings can take place if one feels a need to further wash the macro stickies 28 and the pulp fibers 30 that are retained above the first separation device 20 in order to remove essentially all of the micro stickies, fines, ash as well as any residual contamination that may be present.

The amount of the macro stickies 28 and the pulp fibers 30 retained above the first separation device 20 can vary depending upon the makeup of the starting sample 12. Typically, the amount of the macro stickies 28 and the pulp fibers 30 retained above the first separation device 20 will range from about 1 gram to about 200 grams. More typically, the amount of the macro stickies 28 and the pulp fibers 30 retained above the first separation device 20 will range from about 10 grams to about 100 grams. Even more typical, the amount of the macro stickies 28 and the pulp fibers 30 retained above the first separation device 20 will be in the range of about 20 grams to about 40 grams. After the material residing on the top or upper surface of the first separation device 20 has been washed, it is removed and the size, concentration, amount or any other desired parameter of the macro stickies 28 can be measured. One way of measuring the concentration of the macro stickies 28 is to use a testing device 38, such as a Pulmac Master Screen. The Pulmac Master Screen is commercially available from Pulmac Inc. having an office at 2277 rue Leger, Montreal, Quebec, Canada H8N 2V7. The Pulmac Master Screen is capable of screening the macro stickies 28 from the pulp fibers 30 and then uses image analysis to scan and classify the amount or concentration of the macro stickies 28 relative to the size of the original sample 12. Alternatively, other analytical procedures known to those skilled in the paper making and/or paper testing art can also be used.

Figure 2:
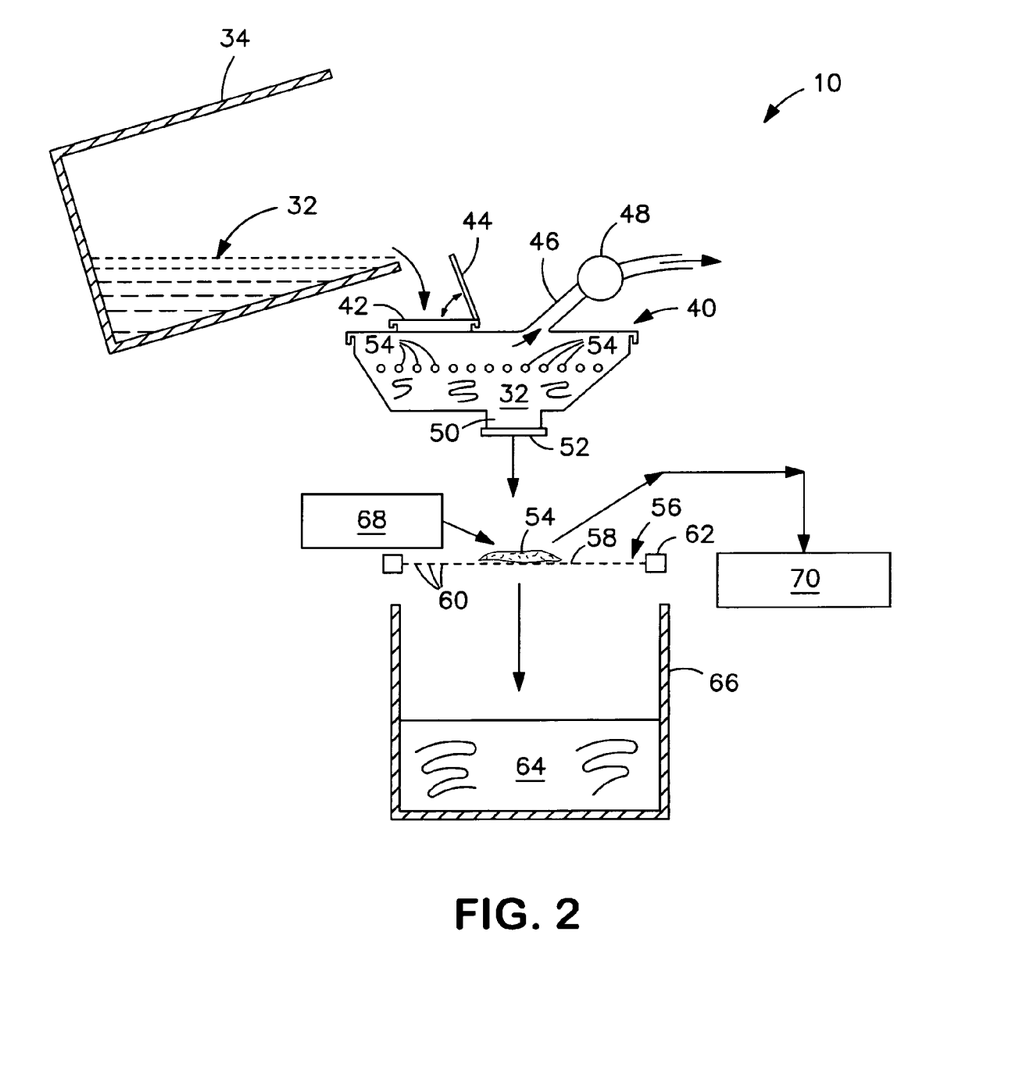
FIG. 2 is a schematic view of a second portion of the method of measuring macro and micro stickies in a recycled sample containing pulp fibers or in process water containing pulp fibers showing the agglomeration of the micro stickies and the use of a second separation to separate the agglomerated micro stickies from the remaining screenate containing liquid, fines and ash.

Referring now to FIG. 2, a second portion of the method 10 for measuring macro and micro stickies in a recycled sample containing pulp fibers or in process water containing pulp fibers 12 is depicted. The screenate 32 retained in the collection vessel 34 is poured into a vacuum chamber 40. The vacuum chamber 40 can be constructed to have various configurations and structures. The particular structure shown in FIG. 2 is one such example. Alternatively, the collection vessel 34 can be completely inserted into a vacuum chamber or be covered to form a vacuum chamber. Another alternative is to simply apply a vacuum to the collection vessel 34.

As represented in FIG. 2, the vacuum chamber 40 has an inlet 42 that can be sealed close by a cover mechanism 44. The cover mechanism 44 is depicted as a pivotable lid that can be pivoted so as to close off the inlet 42. However, one skilled in the mechanical art will know of many different means and apparatuses that can be used to accomplish this function. The vacuum chamber 40 also includes a conduit 46 connected to a vacuum pump 48. The vacuum chamber 40 is of sufficient size to hold the screenate 32 or at least a portion thereof. In addition, air and/or gases will be present in the vacuum chamber 40. The vacuum pump 48 is designed to remove at least a portion, if not all, of the air and gases from the vacuum chamber 40. By "vacuum" it is meant a means to reduce the pressure within the vacuum chamber 40 such as by means of suction. The vacuum pump 48 should be capable of pulling a vacuum of from between about 10 inches of mercury to about 29.7 inches of mercury. Desirably, the vacuum pump 48 is capable of pulling a vacuum of from between about 20 inches of mercury to about 29.7 inches of mercury. More desirably, the vacuum pump 48 is capable of pulling a vacuum of at least about 26 inches of mercury. The vacuum pump 48 can be operated by controls, not shown, for example the electrical controls, that can be designed and connected such that the vacuum pump 48 can be operated on a continuous or intermittent basis, as needed.

The vacuum chamber 40 further has an outlet 50 which can be sealed off by a movable door 52. The movable door 52 can be opened and closed at predetermined times. In FIG. 2, the movable door 52 is depicted as being in a closed position which will prevent any screenate 32, present in the vacuum chamber 40, from being removed. With the outlet 50 closed by the movable door 52, the screenate 32 is poured or routed into the vacuum chamber 40 and the inlet 42 is then sealed off by the cover mechanism 44. The vacuum pump 48 is then turned on and a vacuum of from between about 10 inches of mercury to about 29.7 inches of mercury is applied. The vacuum causes the air and gas present in the vacuum chamber 40 to exit via the conduit 46. The screenate 32 is subjected to this vacuum pressure for a pre-selected period of time. The time interval for applying the vacuum can vary but should be for at least about 1 minute. Desirably, the time interval for applying the vacuum is at least about 2 minutes. More desirably, the time interval for applying the vacuum is from between about 3 minutes to about 120 minutes. Even more desirably, the time interval for applying the vacuum is from between about 4 minutes to about 60 minutes. Most desirably, the time interval for applying the vacuum will be at least about 5 minutes.

The application of the vacuum to the screenate 32 causes the dissolved gases, especially carbon dioxide, to be drawn off and causes the micro stickies to agglomerate into agglomerated micro stickies 54. By "agglomerate" it is meant that the micro stickies are formed or collected into an approximately rounded is mass, such as a ball. The agglomerated micro stickies 54 will rise to the top surface of the screenate 32 and float thereon while in the vacuum chamber 40. This agglomeration technique for the micro stickies is a unique feature of this inventive method. The application of the vacuum allows the micro stickies to be formed into the agglomerated micro stickies 54, while gases are withdrawn from the screenate 32, without having to add any chemical or chemical agent, such as a coagulating chemical, to the screenate 32. Expressed another way, the effect of applying the vacuum simulates vacuum applications present in many papermaking processes. This ability to artificially replicate a condition that causes the spontaneous agglomeration of the micro stickies into agglomerated micro stickies 54 is unique.

It should be understood that chemicals or chemical agents, such as a coagulating chemical, can be added to the screenate 32, if desired. However, the present invention will operate just fine without any chemical or chemical agent being present.

It should also be recognized by those skilled in the art that the micro stickies can be formed into the agglomerated micro stickies 54 using other techniques as well. Three examples of such techniques include but are not limited to the use of ultrasonics, ultraviolet light and irradiation. By "ultrasonics" it is meant the science and technology that deals with the application and use of ultrasound. By "ultraviolet light" it is meant of or relating to the range of invisible radiation wavelengths from about 4 nanometers, on the border of the x-ray region, to about 380 nanometers, just beyond the violet in the visible spectrum; ultraviolet light or the ultraviolet part of the spectrum. By "irradiation" it is meant the act of exposing to radiation or the condition of being so exposed.

Still referring to FIG. 2, after the agglomerated micro stickies 54 have been formed, the screenate 32 is withdrawn from the vacuum chamber 40 by opening the movable door 52. If the collection vessel 34 was subjected to a vacuum, the screenate 32 can simply be poured out of the collection vessel 34 once the collection vessel 34 is removed from the vacuum. The screenate 32 is then routed through a second separation device 56. It should be noted that the agglomerated micro stickies 54 are very fragile and should be handled carefully to insure that they do not break apart. The second separation device 56 can be constructed to be identical or similar to the first separation device 20. Desirably, the second separation device 56 is different from the first separation device 20 in that it utilizes a sieve 58 that is a slotted screen instead of a mesh screen. A slotted screen has been described above. Typically, the second separation device 56 is different from the first separation device 20 so that it can separate any remaining pulp fibers 30 from the agglomerated micro stickies 54.

Alternatively, when the first and second separation devices 20 and 56 are the same, the screenate 32 can be routed back through the first separation device 20 during the second half of the method 10.

In FIG. 2, the second separation device 56 is shown to be a sieve 58, such as a mesh or slotted screen, a screen box, or some other mechanical mechanism which is capable of sifting or dividing out a particular size of particle or compound from the remaining material. The sieve 58 is depicted as a slotted screen having one or more elongated slotted openings 60 formed therein. The slotted screen is at least partially surrounded by a frame 62. By "slotted" it is meant a sieve 58 having at least one narrow elongated slot formed therein. Desirably, a slotted screen will have multiple slots formed therein. Each slot can have a dimension, such as a width dimension, which ranges from between about 0.003 inches (about 75 microns) to about 0.006 inches (about 150 microns). Desirably, each slot can have a dimension that ranges from between about 0.003 inches (75 microns) to about 0.005 inches (about 125 microns). In addition to the width dimension, each slot will have a length that can vary from a fraction of an inch to several inches in dimension.

As depicted in FIG. 2, the agglomerated micro stickies 54 are retained on or above the second separation device 56 while the remaining fines, ash, contaminates and liquid is allowed to pass through the sieve 58. The material that is either liquid or small enough to pass through the sieve 58 is collectively referred to as screenate 64 and can be directed to a drain or sewer or alternatively can be collected in a collection vessel 66. After being collected in the collection vessel 66, the screenate 64 can be disposed of, such as being poured down a drain.

If desired, the agglomerated micro stickies 54 can be further washed with a washing liquid 68, desirably water, having a temperature of less than about 20° C. The reason a relatively cold liquid is used as the washing liquid 68, instead of a warm or hot liquid, is that the cold liquid 68 reduces the breakup of the agglomerated micro stickies 54. It is important that the agglomerated micro stickies 54 remain intact.

The agglomerated micro stickies 54 can then be removed from the second separation device 56 and can be measured using a device 70. The device 70 can be identical, similar or different from the testing device 38 used to test the macro stickies 28. The test protocol for measuring the amount, concentration or some other parameter of the agglomerated micro stickies 54 relative to the size of the original sample 12 can be identical to that used to measure a similar characteristic of the macro stickies 28. It is our understanding that the Pulmac Master Screen will be modified in the future so as to be able to screen and measure the agglomerated micro stickies 54.

It should be understood that the second separation device 56 can be made a part of the device 70. In this case, the screenate 32 after being subjected to a vacuum, can be routed directly into the device 70 and the method explained above will occur within the device 70.

Figure 3:
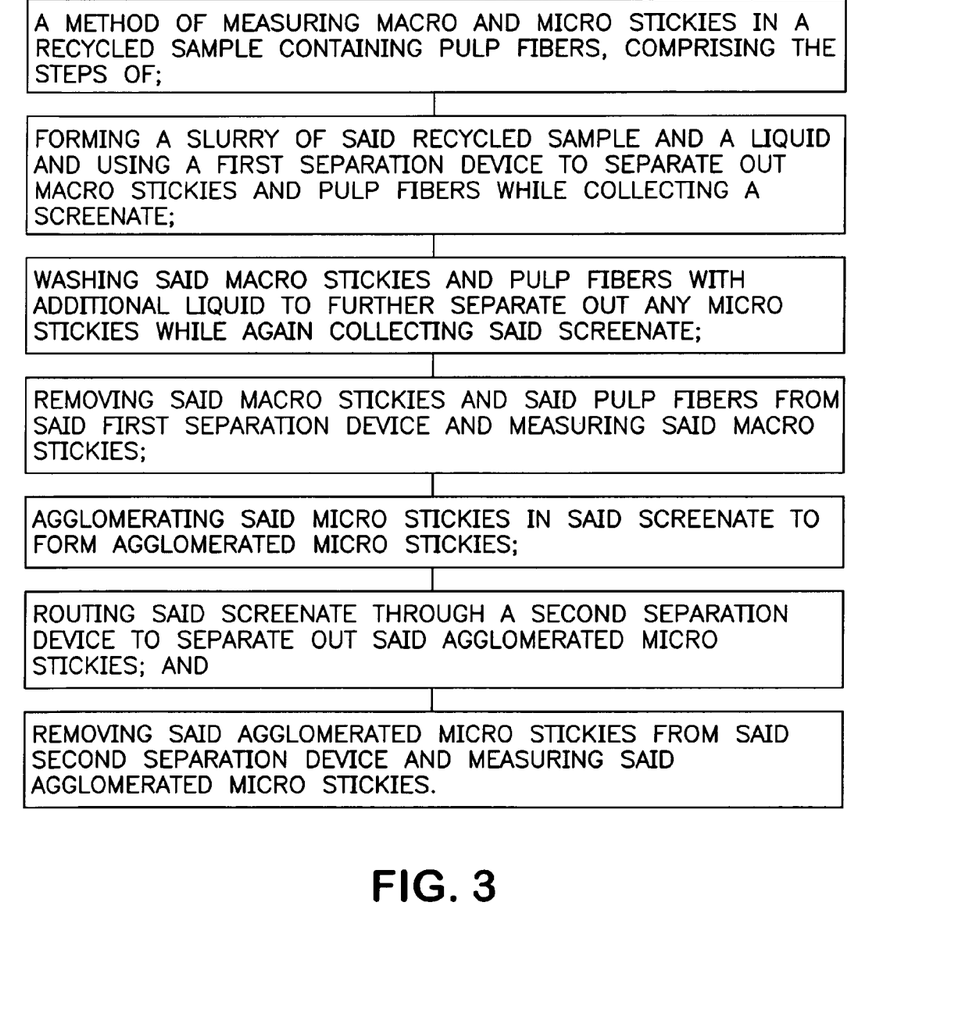
FIG. 3 is a flow diagram of a method of measuring macro and micro stickies in a recycled sample containing pulp fibers or in process water containing pulp fibers.

Referring now to FIG. 3, a flow diagram is depicted of a method 10 of measuring macro and micro stickies in a single, recycled sample containing pulp fibers or in process water containing pulp fibers 12. The method 10 includes the steps of forming a slurry 14 from the sample 12 and a liquid 16, such as water. The liquid consistency of the slurry 14 can be greater than 90%, 95% or 98%. The slurry 14 is then passed through a first separation device 20 to separate out the macro stickies 28 and the pulp fiber 30 while collecting the screenate 32. The screenate 32 includes the liquid 16, micro stickies, fines, ash, as well as any residual contamination that may be present. The macro stickies 28 and the pulp fibers 30 are then washed with additional liquid 36, desirably water, to further separate out any micro stickies while again collecting the screenate 32. The macro stickies 28 and the pulp fibers 30 are then removed from the first separation device 20 so that they can be measured. The macro stickies 28 can be measured along with the pulp fibers 30 but desirably the macro stickies 28 are first separated out from the pulp fibers 30 before being measured. The micro stickies in the remaining screenate 32 are then formed into agglomerated micro stickies 52 using a vacuum for a predetermined time period. The time period is at least about 1 minute; desirably at least about 2 minutes; and more desirably, at least about 5 minutes. However, the time period can vary depending upon the equipment one uses and the amount of screenate 32 one is working with, along with other factors such as temperature, etc. as well be known to those skilled in the art. Once the agglomerated micro stickies 54 are formed, the screenate 32 is then routed through a second separation device 56. Alternatively, the agglomerated micro stickies 54 can be routed back through the first separation device 20 but the size and shape of the openings 24 can be changed to better accommodate the agglomerated micro stickies 54. The second separation device 56 will separate out the agglomerated micro stickies 54 from the remaining liquid, small fines, ash, as well as from any small contaminates that may be present. The agglomerated micro stickies 54 are then removed from the second separation device 56 and the agglomerated micro stickies 54 can be measured. The agglomerated micro stickies 54 can be measured using the device 70.

Figure 4:
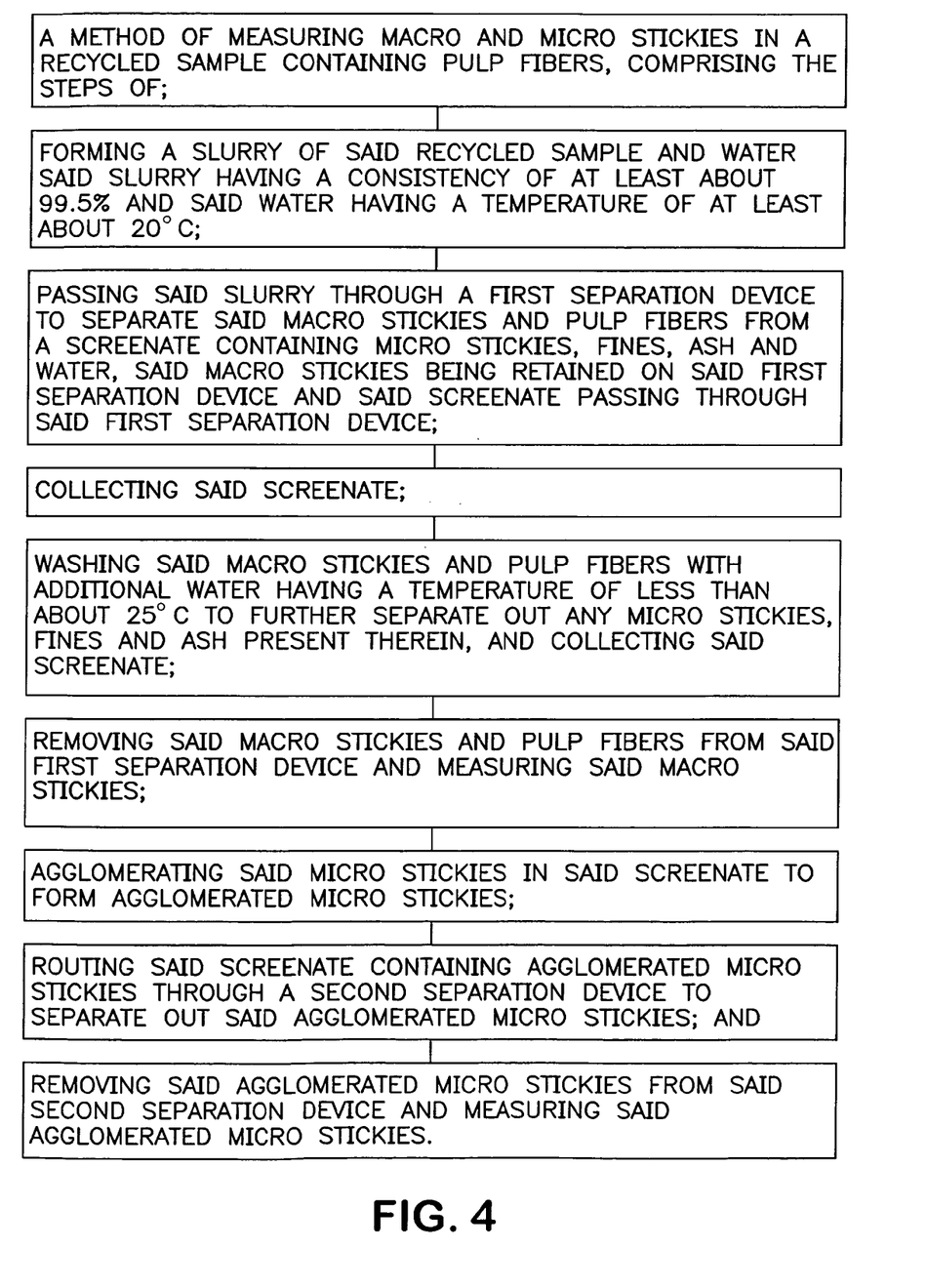
FIG. 4 is a flow diagram of an alternative method of measuring macro and micro stickies in a recycled sample containing pulp fibers or in process water containing pulp fibers.
Figure 6:
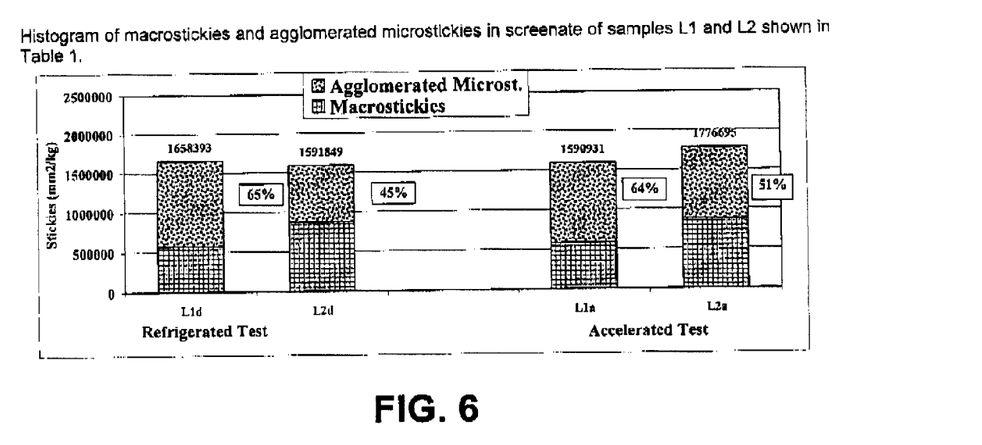

Referring to FIG. 4, a second flow diagram is depicted showing a more detailed method of measuring macro and micro stickies in a single, recycled sample containing pulp fibers or in process water containing pulp fibers 12. This method includes the steps of forming a slurry 14 consisting of the recycled sample 12 and water 16. The slurry 14 has a water consistency of at least about 99.5%. The water 16 also has a temperature of at least about 20° C. The slurry 14 is then passed through a first separation device 20 to separate the macro stickies 28 and the pulp fibers 30 from a screenate 32. The screenate 32 contains water 16, micro stickies, fines, ash, as well as any residual contamination that may be present. The macro stickies 28 and the pulp fibers 30 are retained on the first separation device 20 and the screenate 32 passes easily through the first separation device 20. The screenate 32 is collected in a collection vessel 34. The macro stickies 28 and pulp fibers 30 are washed with additional water 36 having a temperature of at least about 40° C. This secondary washing further separates out any micro stickies, fines and ash present in the macro stickies 28 and the pulp fibers 30 retained on the first separation device 20. This extra screenate 32 is also collected in the same collection vessel 34. The macro stickies 28 and the pulp fibers 30 are then removed from the first separation device 20. The macro stickies 28 can be separated from the pulp fibers 30 before being measured. The macro stickies 28 can be measured using image analysis. This method further includes agglomerating the micro stickies present in the screenate 32 to form agglomerated micro stickies 54. The screenate 32 containing the agglomerated micro stickies 54 are routed through a second separation device 56 to separate out the agglomerated micro stickies 54. The agglomerated micro stickies 54 are then removed from the second separation device 56 and the agglomerated micro stickies 54 are measured. The agglomerated micro stickies 54 can be measured using the same or a different test protocol as was used to measure the micro stickies 28.

Referring to FIG. 5, a third flow diagram is depicted showing still another method of measuring macro and micro stickies in a single, recycled sample containing pulp fibers or in process water containing pulp fibers 12. This method includes the steps of forming a slurry 14 consisting of the recycled sample 12 and water 16. The slurry 14 has a water consistency of at least about 99.5%. The water 16 also has a temperature of at least about 40° C. The slurry 14 is then passed through a first separation device 20 to separate the macro stickies 28 and the pulp fibers 30 from a screenate 32. The screenate 32 contains water 16, micro stickies, fines, ash, as well as any residual contamination that may be present. The macro stickies 28 and the pulp fibers 30 are retained on the first separation device 20 and the screenate 32 passes easily through the first separation device 20. The screenate 32 is collected in a collection vessel 34. The macro stickies 28 and pulp fibers 30 are washed with additional water 36 having a temperature of at least about 40° C. This secondary washing further separates out any micro stickies, fines and ash present in the macro stickies 28 and the pulp fibers 30 retained on the first separation device 20. This extra screenate 32 is also collected in the same collection vessel 34. The macro stickies 28 and the pulp fibers 30 are then removed from the first separation device 20. The macro stickies 28 can be separated from the pulp fibers 30 before being measured. The macro stickies 28 can be measured using image analysis. This method further includes agglomerating the micro stickies present in the screenate 32 to form agglomerated micro stickies 54. The screenate 32 containing the agglomerated micro stickies 54 are routed through a second separation device 56 to separate out the agglomerated micro stickies 54. The agglomerated micro stickies 54 can be washed with additional water 68 having a temperature of less than about 25° C. Desirably, the agglomerated micro stickies 54 can be washed with additional water 68 having a temperature of at least about 20° C. The agglomerated micro stickies 54 are then removed from the second separation device 56 and are measured. The agglomerated micro stickies 54 can be measured using the same or a different test protocol as was used to measure the micro stickies 28.

EXAMPLES

Several trials were conducted using laboratory and mill samples to measure the concentration of macro stickies and micro stickies according to the inventive methods described above.

In the first test, pressure sensitive label stock was mixed with copy paper. The mixture was pulped and screened using a slotted screen having a width dimension of 0.006 inches. Each sample having a weight of 25 grams was pulped for 4 minutes in a Waring blender at 52° C. and 97.5% consistency followed by 10 minutes mixing in a British disintegrator. The samples were subsequently washed with water at 40° C. on a slotted screen with 0.006 inch slots. The first 5 gallons of screenate were collected and subjected to a vacuum of about 26 inches of mercury to agglomerate the micro stickies. The vacuum was applied for at least about 5 minutes. The micro stickies retained on the slotted screen were tested for the quantity of agglomerated micro stickies. Screenate was collected and micro stickies were then agglomerated using a two week refrigeration method, as well as the presently described agglomerated micro stickies method. The results are shown in Table 1 and in Bar Chart 1. Experimental details are recited in a reference entitled: "DETERMINATION OF MACRO AND MICRO STICKIES IN THE SAME STOCK AND WATER SAMPLES" authorized by Robert de Jong, Salman Aziz and Mahendra Doshi and printed in Progress in Paper Recycling, Vol. 15, No 4, pages 22-28, dated August, 2006. This information is incorporated by reference and made a part hereof.

TABLE 1

Agglomerated micro stickies in unused, EHA based label samples L1 and L2 (scanned at 115 threshold)

| | | Test method using 2 weeks cold storage | | Test method using accelerated test | |
|---|---|---|---|---|---|
| | | Test L1d | Test L2d | Test L1a | Test L2a |
| | | # of tests | | | |
| Attribute | Unit | 1 | 2 | 1 | 3 |
| Macro stickies | mm²/kg | 578 193 | 869 674 | 578 193 | 869 674 |
| Agglomerated micro stickies | mm²/kg | 1 080 200 | 722 175 | 1 012 738 | 907 021 |
| Total | mm²/kg | 1 658 393 | 1 591 849 | 1 590 931 | 1 776 695 |
| % Agglomerated micro stickies of total | % | 65% | 45% | 64% | 51% |

Note:
mm²/kg = millimeters squared per kilogram.

The results from the two week refrigeration method and the presently described agglomerated micro stickies method are quite comparable.

In a second example, the presently described agglomerated micro stickies method was used to evaluate the efficiency of various unit operations in a mill. For instance, is a slotted screen removing macro stickies or turning them into micro stickies? Is a dissolved air flotation cell doing a poor job of removing micro stickies? Some actual mill test results for a slotted screen and a dissolved air flotation cell are shown in Tables 2 and 3, respectively.

TABLE 2

Test results for samples from fine slotted screen feed and accepts

| | | Fine Screen Stickies Level | | Stickies |
|---|---|---|---|---|
| Attribute | Unit | Feed | Accepts | Removal Eff. % |
| Macro stickies | mm²/l | 13.1 | 2.9 | 78% |
| Agglomerated micro stickies | mm²/l | 1.1 | 0.5 | 51% |
| Total | mm²/l | 14.2 | 3.4 | 76% |
| % Agglomerated micro stickies of total | % | 7.5% | 15.2% | |

Note:
mm²/l = millimeters squared per liter of sample.

The stickies removal efficiency (SRE) of the fine screens for all macro stickies was 78%. A further examination of the scan results showed that the SRE was 95.5% (from 5.8 to 0.3 mm$^2$/l) for large macro stickies >2,000 micron. Large macro stickies are typically removed by fine slotted screens.

The test results for the Dissolved Air Flotation (DAF) cell are shown in Table 3. The DAF cell did an excellent job of removing macro stickies but had trouble removing micro stickies.

TABLE 3

Test results for samples from DAF cell feed and accepts.

| Attribute | Unit* | Krofta Stickies Level | | Stickies |
| --- | --- | --- | --- | --- |
| | | Feed | Accepts | Removal Eff. % |
| Macro stickies | mm$^2$/l | 16.7 | 0.3 | 98% |
| Agglomerated micro stickies | mm$^2$/l | 0.6 | 0.8 | −29% |
| Total | mm$^2$/l | 17.3 | 1.1 | 93% |
| % Agglomerated micro stickies of total | % | 3.5% | 69.9% | |

*= Results are expressed as area of stickies using TAPPI method per liter of sample.

The presently described inventive agglomerated micro stickies method can be applied using conventional apparatus as well as a Pulmac Master Screen. The use of a Pulmac Master Screen will allow the method to be automated with minimum operator interface.

In a third test, the same pressure sensitive label stock was mixed with copy paper. The mixture was pulped for four (4) minutes with dilution water at a temperature of 52° C. The stock was diluted to 99.5% water consistency and washed with dilution wash water maintained at a temperature of 52° C. on a 200 mesh screen as shown in FIG. 1. The macro stickies and the pulp fibers were retained on the mesh screen and the screenate containing water, micro stickies, fine and ash, as well as any residual contamination that may have been present, was collected in a five (5) gallon bucket. The bucket was then subjected to vacuum of approximately 25 inches of mercury (Hg) for five (5) minutes. The total procedure was repeated four times to assess the repeatability of the method of pulping, screening, washing and vacuum treatment.

The stock and macro stickies retained on the screen were collected and again screened on a Pulmac Master Screen using a slotted screen having a width dimension of 0.006 inches, using dilution water having a temperature of 46° C. The standard washing temperature of 46° C. was subsequently considered to be too high for the agglomerated micro stickies, so a washing temperature of less than about 25° C. was specified since the agglomerated micro stickies are more easily broken up at high temperatures.

The agglomerated micro stickies were again screened on the Pulmac Master Screen under the same conditions. The filter papers containing the agglomerated micro stickies were dried and dyed with blue dye, so that the number and area of blue agglomerated micro stickies on each filter paper could be determined. The results are shown in Table 4.

TABLE 4

Stickies area of repulped label samples

| | Stickies Area | | | |
| --- | --- | --- | --- | --- |
| Sample | (mm$^2$) | (mm$^2$/kg label) | % of Total | Comments |
| Macro 1 | | | | Failed (drain valve open) |
| Macro 2 | | | | Filter paper not folded |
| Macro 3 | 471.2 | 406,207 | | |
| Macro 4 | 435.3 | 375,259 | | |
| Macro average | 453.3 | 390,733 | | |
| Micro 1 | 15.31 | 13,198 | | Contamination from vac. lid? |
| Micro 2 | 14.92 | 12,862 | | |
| Micro 3 | 13.90 | 11,983 | 2.9 | |
| Micro 4 | 2.66 | | | Too little vac. or filter paper error. |
| Micro average | 14.71 | 12,681 | 3.2 | |

Although some of the tests were aborted due to problems with the filter paper, the results in Table 4 show that:
1. The observed macro stickies area in the two macro stickies tests (Macro 3 and 4) was comparable; and
2. The observed agglomerated micro stickies area in the three micro stickies tests (Micro 1-3) was comparable.

It can be seen from the results in Tables 1-4 that the agglomeration of the micro stickies by applying vacuum to the screenate is particularly effective with reproducible results. It is believed that automating the test procedure may improve the results even further.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A method of measuring macro and micro stickies in a recycled sample containing pulp fibers, comprising the steps of:
   a) forming a slurry of said recycled sample and a liquid and using a first separation device to separate out macro stickies and pulp fibers while collecting a screenate;
   b) washing said macro stickies and pulp fibers with additional liquid to further separate out any micro stickies while again collecting said screenate;
   c) removing said macro stickies and said pulp fibers from said separation device and measuring said macro stickies;
   d) subjecting said micro stickies in said screenate to a vacuum to form agglomerated micro stickies;
   e) routing said screenate containing said agglomerated micro stickies through a second separation device to separate out said agglomerated micro stickies; and
   f) removing said agglomerated micro stickies from said second separation device and measuring said agglomerated micro stickies.

2. The method of claim 1 further including forming said slurry to a liquid consistency of above 98% and said screenate comprising micro stickies, fines, ash and liquid.

3. The method of claim 1 wherein said first and second separation devices are the same device.

4. The method of claim 1 wherein said screenate containing micro stickies is subjected to a vacuum of from between about 10 to about 29.7 inches of mercury for at least about 2 minutes.

5. The method of claim 1 wherein said macro stickies and pulp fibers are washed with a liquid having a temperature of less than about 25° C.

6. The method of claim 1 wherein said first separation device is a mesh screen and said second separation device is a slotted screen.

7. The method of claim 1 wherein each of said first and second separation devices is a screen having a mesh size ranging from between about 50 to about 400.

8. The method of claim 1 wherein each of said first and second separation devices is a slotted screen having at least one slot formed therein, said slot having a dimension ranging from between about 0.003 inches to about 0.006 inches.

9. The method of claim 1 wherein said micro stickies are agglomerated using a vacuum treatment for a time period of at least about 5 minutes.

10. A method of measuring macro and micro stickies in a recycled sample containing pulp fibers, comprising the steps of:
   a) forming a slurry of said recycled sample and water, said slurry having a consistency of at least about 99.5% and said water having a temperature of at least about 20° C.;
   b) passing said slurry through a first separation device to separate said macro stickies and pulp fibers from a screenate containing micro stickies, fines, ash and water, said macro stickies being retained on said first separation device and said screenate passing through said separation device;
   C) collecting said screenate;
   d) washing said macro stickies and pulp fibers with additional water having a temperature of less than about 25° C. to further separate out any micro stickies, fines and ash present therein, and collecting said screenate;
   e) removing said macro stickies and pulp fibers from said first separation device and measuring said macro stickies;
   f) subjecting said micro stickies in said screenate to a vacuum to form agglomerated micro stickies;
   g) routing said screenate containing said agglomerated micro stickies through a second separation device to separate out said agglomerated micro stickies; and
   h) removing said agglomerated micro stickies from said second separation device and measuring said agglomerated micro stickies.

11. The method of claim 10 further comprising washing said agglomerated micro stickies with water having a temperature of less than about 25° C.

12. The method of claim 10 wherein said agglomerated micro stickies are measured using a Pulmac Master Screen.

13. The method of claim 10 wherein said screenate containing micro stickies is subjected to a vacuum of from between about 10 to about 29.7 inches of mercury to agglomerate said micro stickies for at least about 2 minutes.

14. The method of claim 10 wherein said screenate containing micro stickies is subjected to a vacuum of at least about 26 inches of mercury to agglomerate said micro stickies.

15. The method of claim 10 wherein said micro stickies are agglomerated at least about 5 minutes.

16. The method of claim 10 further comprising adding a chemical to said screenate to assist in forming said agglomerated micro stickies.

17. The method of claim 10 further comprising adding a coagulant to said screenate to assist in forming said agglomerated micro stickies.

18. The method of claim 10 wherein said agglomerated micro stickies are measured using image analysis.

19. The method of claim 10 wherein said second separation device is a Pulmac Master Screen and is a slotted screen having multiple slots formed therein, each slot having a dimension ranging from between about 0.003 inches to about 0.006 inches.

20. A method of measuring the concentration of macro and micro stickies in a single recycled sample containing pulp fibers, comprising the steps of:
   a) forming a slurry of said recycled sample and water having a temperature of at least about 40° C., said slurry having a consistency of at least about 99.5% water;
   b) passing said slurry through a first separation device to separate said macro stickies and said pulp fibers from a screenate containing micro stickies, fines, ash and water, said macro stickies being retained on said first separation device and said screenate passing through said separation device;
   c) collecting said screenate;
   d) washing said macro stickies and said pulp fibers with additional water having a temperature of at least about 40° C. to further separate out any micro stickies, fines and ash present therein, and collecting said screenate;
   e) removing said macro stickies and pulp fibers from said first separation device and measuring said concentration of said macro stickies;
   f) subjecting said micro stickies in said screenate to a vacuum to form agglomerated micro stickies;
   g) routing said screenate containing said agglomerated micro stickies through a second separation device to separate out said agglomerated micro stickies;
   h) washing said agglomerated micro stickies with additional water having a temperature of less than about 25° C. to further separate out any micro stickies, fines and ash present therein; and
   i) removing said agglomerated micro stickies from said second separation device and measuring said concentration of said agglomerated micro stickies.

* * * * *